(12) United States Patent
Moise

(10) Patent No.: US 7,071,844 B1
(45) Date of Patent: Jul. 4, 2006

(54) MOUTH MOUNTED INPUT DEVICE

(76) Inventor: Aurelian Phillip Moise, 2427 Somerset Ave., Castro Valley, CA (US) 94546

( * ) Notice: Subject to any disclaimer, the term of this patent is extended or adjusted under 35 U.S.C. 154(b) by 295 days.

(21) Appl. No.: 10/242,181

(22) Filed: Sep. 12, 2002

(51) Int. Cl.
*H04Q 7/00* (2006.01)

(52) U.S. Cl. .............................. 341/21; 341/5; 341/20; 340/825.19; 600/534; 345/157

(58) Field of Classification Search ................ 341/20, 341/5, 21, 22; 345/173, 163, 157; 340/825.19; 600/534; 178/18.01
See application file for complete search history.

(56) References Cited

U.S. PATENT DOCUMENTS

| | | | | |
|---|---|---|---|---|
| 4,983,786 | A * | 1/1991 | Stevens et al. | 178/18.01 |
| 5,460,186 | A * | 10/1995 | Buchhold | 600/590 |
| 5,523,745 | A * | 6/1996 | Fortune et al. | 340/825.19 |
| 5,579,284 | A * | 11/1996 | May | 367/132 |
| 5,603,065 | A * | 2/1997 | Baneth | 710/73 |
| 5,631,669 | A * | 5/1997 | Stobbs et al. | 345/163 |
| 5,792,067 | A * | 8/1998 | Karell | 600/534 |
| 5,828,758 | A * | 10/1998 | Byce et al. | 381/70 |
| 6,222,524 | B1 * | 4/2001 | Salem et al. | 345/157 |
| 6,400,353 | B1 * | 6/2002 | Ikehara et al. | 345/157 |

\* cited by examiner

*Primary Examiner*—Albert K. Wong
(74) *Attorney, Agent, or Firm*—Jack Lo

(57) ABSTRACT

A mouth mounted computer input device is comprised of a curved housing shaped to closely engage the roof of the mouth against the front teeth. A touch pad is arranged on the bottom of the housing, and an electrical stimulator is arranged on the top of the housing. A microphone, a camera, a temperature sensor, a pulse monitor, and a first transceiver are also positioned in the housing. A fiber optic lens connected to the camera and projecting from the housing is arranged to be positioned between two front teeth. A second transceiver is connected to a personal computer. The touch pad is operable by the tongue for cursor control. The stimulator provides pulsed electrical stimulation to the mouth to present alphanumeric information. The microphone enables speech input, and the camera enables video input, the temperature sensor measures body temperature, and the pulse monitor measures heart rate.

7 Claims, 4 Drawing Sheets

MOUTH MOUNTED INPUT DEVICE

BACKGROUND OF THE INVENTION

1. Field of the Invention

This invention relates generally to computer input devices.

2. Prior Art

Computer input devices include keyboards, mice, trackballs, touch pads, microphones, and cameras. Input devices that control cursor movement are also known as pointing devices, and include mice, trackballs, and touch pads. A conventional touch pad includes a flat, touch sensitive surface which tracks the movement of a fingertip across it. Touch pads are commonly found on portable or notebook computers. Although most input devices are connected to the computer with cords, cordless mice, trackballs, microphones, and cameras are also well known in the art. A conventional cordless input device includes a transmitter that remotely communicates with a receiver connected to the computer through a communications port, such as a USB (universal serial bus) port.

Since conventional input devices are controlled by hand, the user cannot perform other manual functions while using such input devices. Handicapped people without the use of their hands cannot use conventional input devices. Although input devices have been adapted for use by handicapped people, they are generally operated by a clumsy stick held in the mouth of the user.

The entire head must be moved to use the stick to operate a special keyboard or mouse. Since the head is heavy, it is limited to slow movements that result in slow computer operation. Further, moving the head repeatedly over long periods can cause fatigue and perhaps injury to the neck.

BRIEF SUMMARY OF THE INVENTION

Accordingly, the objects of the present mouth mounted input device are:

to enable cursor control by the tongue with a touch pad in the mouth;

to enable speech input with a microphone in the mouth;

to enable video input with a camera in the mouth;

to monitor body temperature;

to monitor heart rate;

to present alphanumeric information to the user through a stimulator in the mouth;

to be cordlessly connected to a personal computer or home automation system;

to enable control of various computerized devices; and to incorporate a built-in computer.

A mouth mounted input device is comprised of a curved housing shaped to closely engage the roof of the mouth against the front teeth. A touch pad is arranged on the bottom of the housing, and an electrical stimulator is arranged on the top of the housing. A microphone, a camera, a temperature sensor, a pulse monitor, and a first transceiver are also positioned in the housing. A second transceiver is connected to a personal computer for enabling communication between the input device and the computer. The touch pad is operated by the tongue for controlling a cursor on the computer's display. The stimulator provides pulsed electrical stimulation to the mouth to present alphanumeric information received from the computer. The microphone enables speech input into the computer. A fiber optic lens connected to a camera and projecting from the housing is arranged to be positioned between two front teeth for receiving video input. The temperature sensor measures body temperature, and the pulse monitor measures heart rate. In another embodiment, the input device is arranged to communicate with other microprocessor controlled devices, including a home automation system, an automobile, a satellite television receiver, and a Web television receiver.

BRIEF DESCRIPTION OF THE SEVERAL VIEWS OF THE DRAWING

FIG. 1 is a perspective view of the present mouth mounted input device and the computers the input device can communicate with.

DRAWING REFERENCE NUMERALS

| | |
|---|---|
| 10. Housing | 11. Top |
| 12. Bottom | 13. Front Edge |
| 14. Transceiver | 15. Transceiver |
| 16. Computer | 17. Touch Pad |
| 18. Cursor | 19. Display |
| 20. Stimulator | 21. Microphone |
| 22. Camera | 23. Fiber Optic Lens |
| 24. Automation Controller | 25. Appliance |
| 26. Temperature Sensor | 27. Pulse Monitor |
| 28. Handheld Computer | 29. Transceiver |
| 30. Input Device | 31. Input Device |
| 32. CPU | 33. Computer |
| 34. Fax Machine | 35. Scanner |
| 36. Automotive Computer | 37. Sound System |
| 38. Lights | 39. Satellite Television |
| 40. Television | 41. Web TV Receiver |

DETAILED DESCRIPTION OF THE INVENTION

Figure 1:
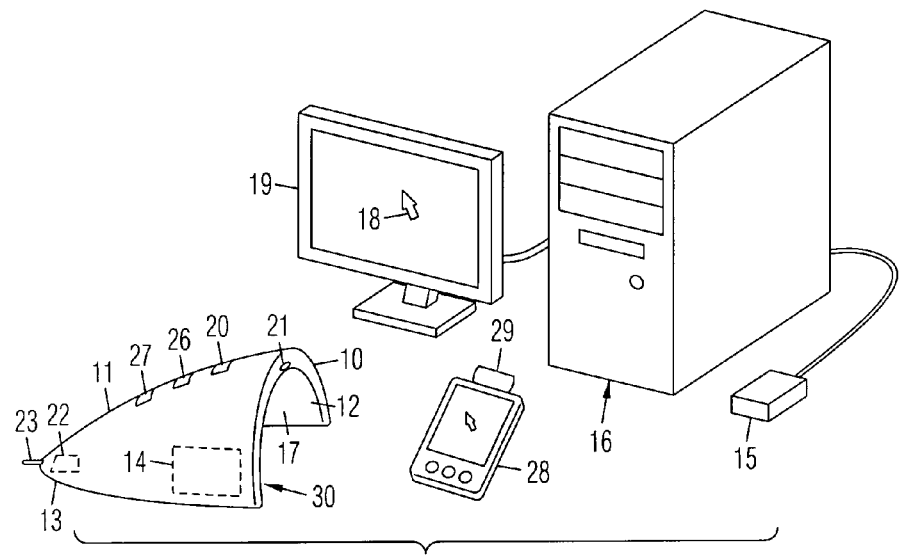
Figure 2:
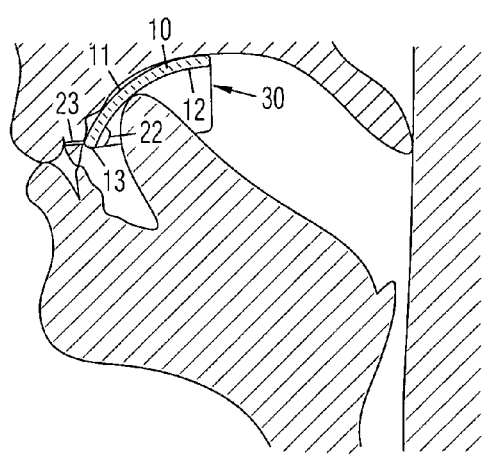
FIG. 2 is a side sectional view of the input device in a mouth.

FIGS. 1–2:

A preferred embodiment of the present mouth mounted input device 30 is shown in a side perspective view in FIG. 1 and in a sectional view inside a mouth in FIG. 2. It is comprised of a housing 10 with a convex top 11, a concave bottom 12, and a curved front edge 13. Top 11 and bottom 12 are generally curved about a longitudinal axis for closely engaging the roof of the mouth. Front edge 13 is generally curved about a vertical axis for closely engaging the back of the front teeth.

A first transceiver 14 is positioned inside housing 10 for communication with a second transceiver 15 connected to a computer 16 through a communications port, such as a USB port (the input device is shown out of scale with the computer). Computer 16 may be any type of computer, including a personal computer, a networked computer, a main frame computer, etc. Input device 30 may also be arranged to communicate with a miniature computer, such as a pocket-sized handheld computer 28 equipped with a transceiver 29.

Input device 30 includes a concave touch pad 17 conforming to concave bottom 12 of housing 10 for being touch by the tongue. Touch pad 17 is arranged to communicate touch information to computer 16. For example, the tip of the tongue is movable across touch pad 17 to move a cursor 18 across a display 19 connected to computer 16. Cursor control is thus provided without requiring a free or usable hand. Touch pad 17 may be arranged to perform the function of a joystick for controlling a computer game, driving a wheelchair, controlling an aircraft, or controlling other devices. Touch pad 17 may also be used for inputting Morse code, for example, by tapping. Input device 30 is thus suitable for use by people who do not have a free hand available for handling a conventional pointing device, or by handicapped people without the use of their hands.

An electrical stimulator 20 is arranged on top 11 of housing 10 for stimulating the roof of the mouth to present information received from the computer, such as alphanumeric information. Stimulator 20 is preferably comprised of an electrode that applies a noticeable but safe voltage to the mouth. The voltage may be applied in pulsed form, such as Morse code. Alternatively, stimulator 20 may be comprised of a tactile braille device with movable pins that present information in braille. A temperature sensor 26 and a pulse monitor 27 are also arranged on top of housing 10 for monitoring body temperature and heart rate.

A microphone 21 is positioned in housing 10 for enabling speech input or voice control of computer operation using conventional speech recognition software. Microphone 21 may be used to transmit voice communications, such as telephone communications, through a modem (not shown) in computer 16. An ear piece or speaker (not shown) may be connected to input device 30 and positioned in the ear for outputting audio information. Computer 16 may be arranged to recognize Morse code, such as by recognizing the clicking of the teeth picked up by microphone 21, and transmit the Morse code through transceiver 14.

A miniature camera 22 is positioned inside housing 10 for enabling video input. An elongated lens 23, such as a fiber optic lens, connected to camera 22 and projecting from the front of housing 10 is arranged to be positioned between two front teeth for providing a view in front of the user when the lips are open. Touch pad 17 is arranged for controlling focus and zooming of camera 22 by detecting the forward and backward movement of the tongue. Camera 22 is thus suitable for covert operations.

Figure 3:
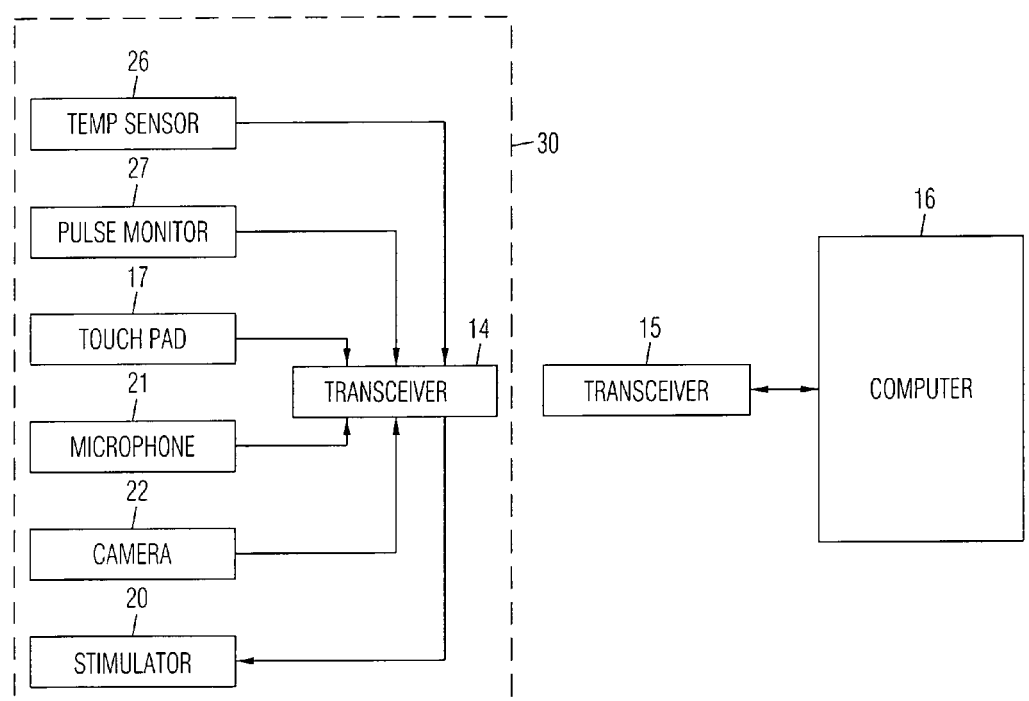
FIG. 3 is a block diagram thereof arranged to communicate with a separate computer.

FIG. 3:

An electrical block diagram of input device 30 is shown in FIG. 3. First transceiver 14 is connected to touch pad 17, microphone 21, camera 22, stimulator 20, temperature sensor 26, and pulse monitor 27. Second transceiver 15 is connected to personal computer 16 through a communications port, such as a USB port. Inputs detected by touch pad 17, microphone 21, and camera 22 are transmitted to personal computer 16 by transceiver 14 and received by transceiver 15. Alphanumeric information from computer 16 is transmitted from transceiver 15 to transceiver 14, and presented to the user's mouth through stimulator 20.

Figure 4:
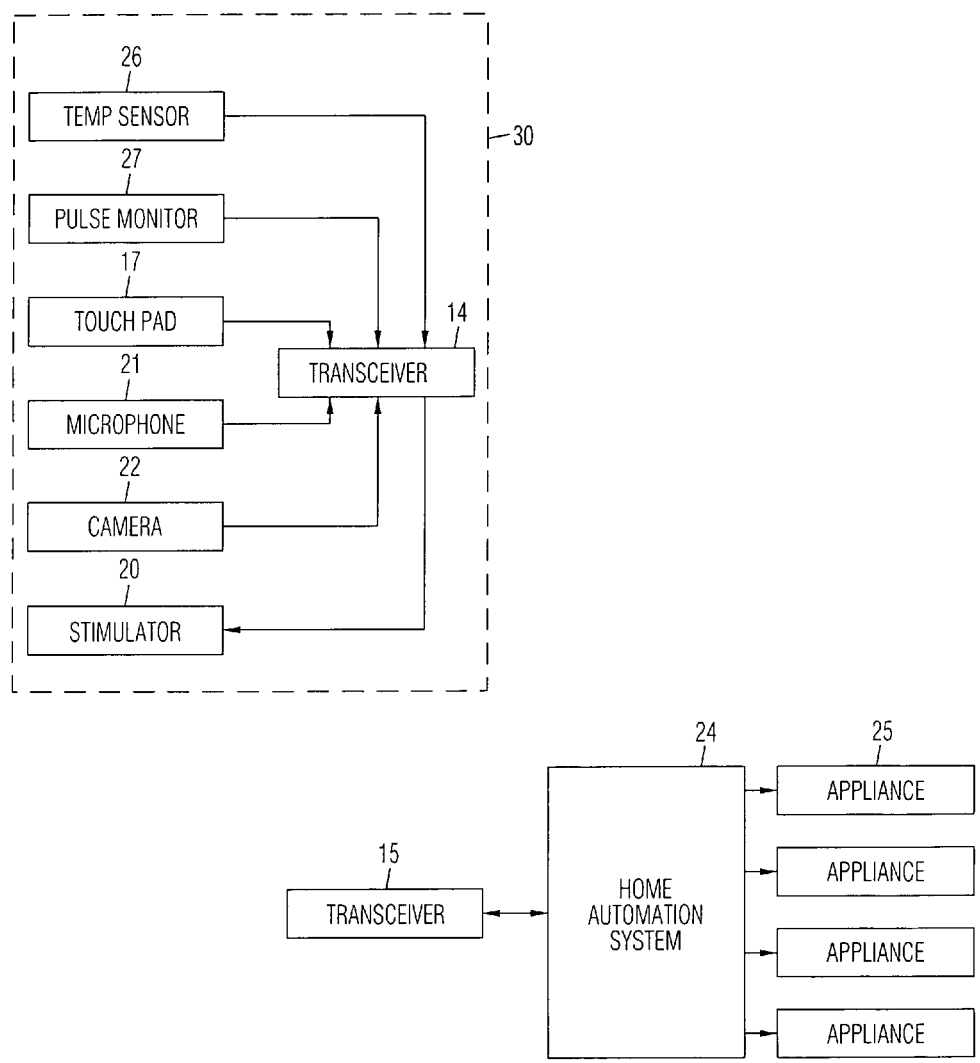
FIG. 4 is a block diagram thereof arranged to communicate with a home automation system.

FIG. 4:

In FIG. 4, input device 30 is arranged to communicate with a conventional home automation system 24 which is connected to a second transceiver 15 for controlling the operation of appliances 25, such as electrical lights, heaters, air conditioners, televisions, etc. Since controller 24 is programmed to recognize signals from its own transmitter (not shown), first transceiver 14 in input device 30 may be arranged to replace the original automation system transmitter by converting speech or touch pad input into signals recognizable by automation controller 24.

Figure 5:
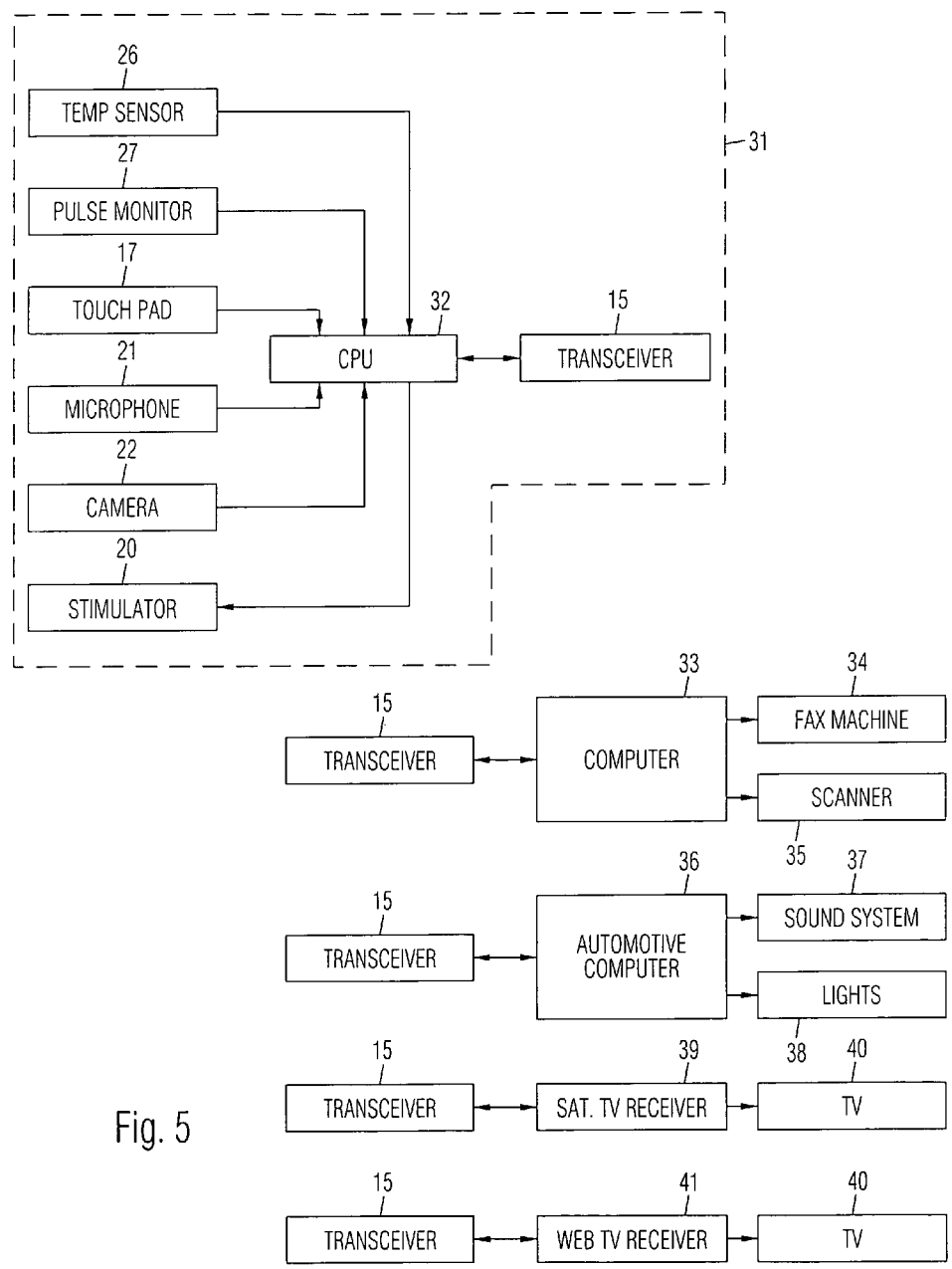
FIG. 5 is a block diagram of another embodiment thereof arranged to communicate with other microprocessor controlled devices.

FIG. 5:

An alternative embodiment of the invention shown in FIG. 5 is comprised of an input device 31 with an embedded CPU or central processing unit 32. Temperature sensor 26, pulse monitor 27, touch pad 17, microphone 21, camera 22, stimulator 20, and transceiver 15 are connected to CPU 32. Input device 31 is operable independently of computer 16 (FIG. 1), so that it may be operated portably in a variety of environments. Input device 31 is arranged to communicate with a variety of compatible devices, including but not limited to 1) a computer 33 with transceiver 15 for controlling connected peripherals, such as a fax machine 34, a scanner 35, etc.; 2) an automotive computer 36 in a motor vehicle (not shown) with transceiver 15 for controlling vehicle components, such as a sound system 37, lights 38, etc.; 3) a satellite television receiver 39 with transceiver 15 for controlling operation of a connected television 40; and 4) an Internet or Web television receiver 41 with transceiver 15 for surfing the World Wide Web on television 40.

Accordingly, the present mouth mounted input device enables cursor control by the tongue with a touch pad in the mouth. It enables speech input from a microphone in the mouth. It enables video input from a camera in the mouth. It monitors body temperature and heart rate. It presents alphanumeric information to the user through a stimulator in the mouth. It also cordlessly connects to a personal computer or home automation system.

Although the foregoing description is specific, it should not be considered as a limitation on the scope of the invention, but only as an example of the preferred embodiment. Many variations are possible within the teachings of the invention. For example, the housing may be connected to the computer by a cable to eliminate the transceivers. Therefore, the scope of the invention should be determined by the appended claims and their legal equivalents, not by the examples given.

I claim:

1. A mouth mounted input device, comprising:
   a housing with a curved top, a concave bottom, and a curved front edge, wherein said top is curved for closely engaging a roof of a mouth, and said front edge is curved for closely engaging a back of front teeth in said mouth;
   a curved touch pad conforming to said concave bottom of said housing for tracking tongue movement thereon;
   an electrical stimulator on said top of housing for stimulating said roof of said mouth to present pulsed information;
   a temperature sensor in said housing for monitoring body temperature;
   a pulse monitor in said housing for monitoring heart rate;
   a microphone in said housing for receiving speech input; and
   a camera in said housing for receiving video input.

2. The mouth mounted input device of claim 1, wherein said stimulator is comprised of an electrode that applies a voltage to said mouth.

3. The mouth mounted input device of claim 1, wherein said stimulator is comprised of a tactile braille device.

4. The mouth mounted input device of claim 1, further including an elongated lens on said front edge of said housing and connected to said camera for being projecting between said front teeth.

5. The mouth mounted input device of claim 1, further including a first transceiver positioned in said housing and connected to said touch pad, said stimulator, said temperature sensor, said pulse monitor, said microphone, and said camera, and further including a second transceiver for connecting to a remote computer, wherein said second transceiver is arranged to remotely communicate with said first transceiver.

6. The mouth mounted input device of claim 1, further including a first transceiver positioned in said housing and connected to said touch pad, said stimulator, said temperature sensor, said pulse monitor, said microphone, and said camera, and further including a second transceiver connected to a remotely operated home automation system for controlling operation of appliances.

7. The mouth mounted input device of claim 1, further including a central processing unit in said housing and connected to said touch pad, said electrical stimulator, aid temperature sensor, said pulse monitor, said microphone, and said camera.

\* \* \* \* \*